Figure 1:
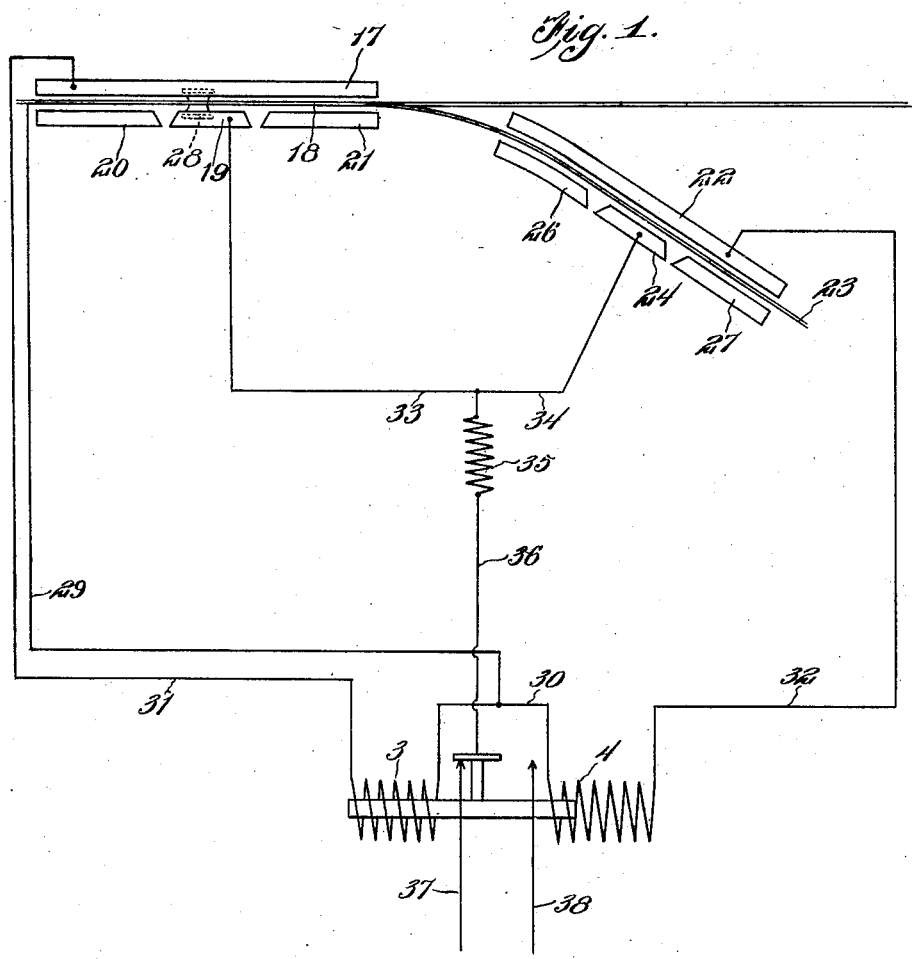

B. SCHLATER.
ELECTRICALLY CONTROLLED RAILWAY SWITCH.
APPLICATION FILED JUNE 28, 1909.

991,247.

Patented May 2, 1911.
2 SHEETS—SHEET 1.

Witnesses
Louis R. Heinrichs
K. Allen

Inventor
Bernard Schlater
By Victor J. Evans
Attorney

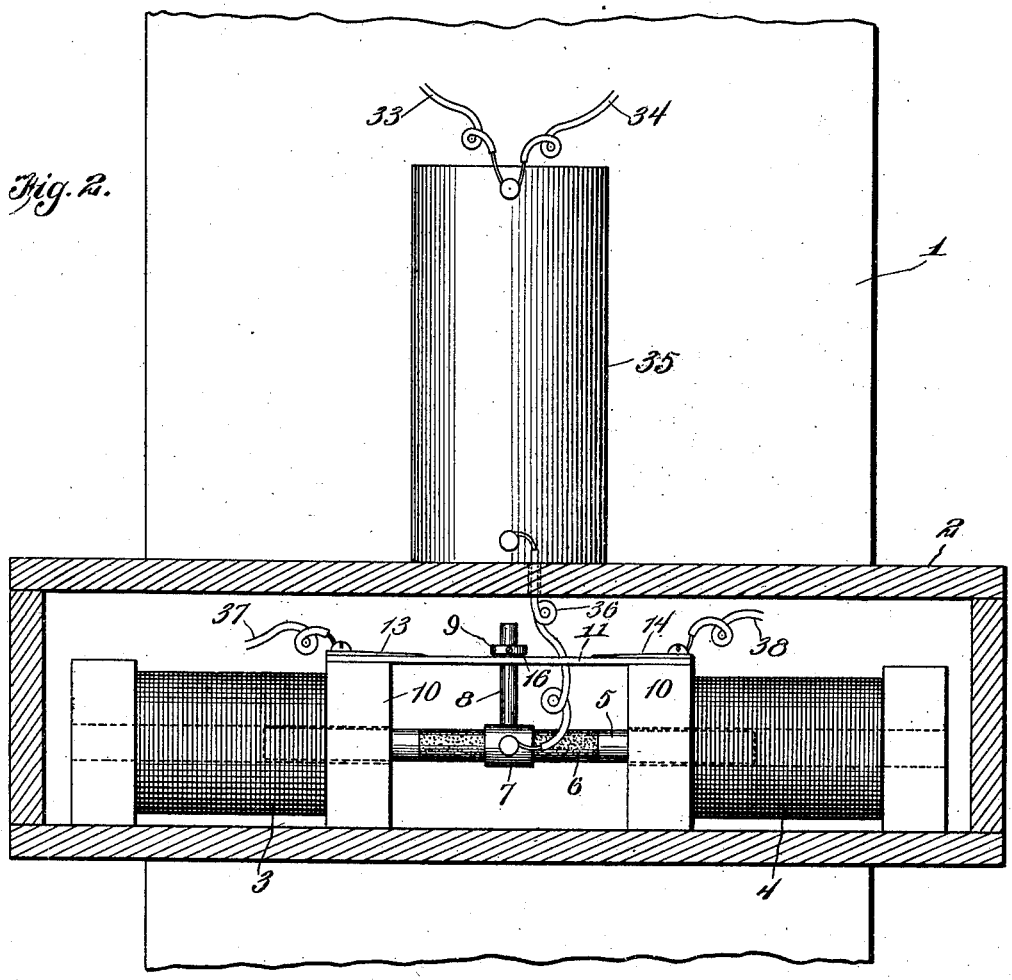

UNITED STATES PATENT OFFICE.

BERNARD SCHLATER, OF NEW ALBANY, INDIANA.

ELECTRICALLY-CONTROLLED RAILWAY-SWITCH.

991,247.

Specification of Letters Patent.  Patented May 2, 1911.

Application filed June 28, 1909. Serial No. 504,795.

*To all whom it may concern:*

Be it known that I, BERNARD SCHLATER, a citizen of the United States, residing at New Albany, in the county of Floyd and State of Indiana, have invented new and useful Improvements in Electrically-Controlled Railway-Switches, of which the following is a specification.

The invention relates to an improvement in electrically controlled railway switches designed to be operated in the travel of a car, whereby the motorman can control the movement of the switch at will and cause his car to travel the main track or take the siding as desired.

The main object of the present invention is the provision of means whereby the first or controlling car so governs the mechanism that the following car cannot operate the switch while the controlling car is passing over the same, said means operating to give the first or controlling car power to set the switch as desired and return the same to normal position without regard to the influence of the following car.

The invention will be described in the following specification, reference being had particularly to the accompanying drawings, in which:—

Figure 1 is a diagrammatic view, illustrating the various controlling circuits. Fig. 2 is an enlarged view in elevation, partly in section, showing the means for controlling the current supply to the switch governing mechanism. Fig. 3 is a perspective of the guide plate for the movable contact. Fig. 4 is a perspective view of one of the fixed contacts of the controlling mechanism.

Referring particularly to the accompanying drawings, my improved switch controlling mechanism is designed for use with the ordinary trolley service and is designed particularly to permit a car advancing along the main track to automatically position the switch so that the car may take the main or siding tracks at pleasure. It has been heretofore proposed to provide for such control, but the disadvantages of such constructions reside in the fact that having operated the switch the controlling car rides beyond the switch influencing position so that a following car could ride into such position as to throw the switch while the controlling car was passing over the same. The present invention is designed particularly to overcome this disadvantage and to permit the controlling car to alone govern the switch operating mechanism until such car has passed safely beyond the switch points.

In carrying out the preferred form of details of the invention I mount upon a pole 1 adjacent the switch a casing 2, in which are arranged opposing solenoids 3 and 4. A core 5 is oppositely controlled by the respective solenoids, coöperating with each and being centrally formed with an insulating section 6. A contact member is carried on the insulating section of the core comprising a sleeve 7 secured upon the core, a post 8 rising from the sleeve, and a contact button 9 carried by the upper end of the post. Connecting the adjacent insulated heads 10 of the respective cores is a bridge piece 11 formed with a centrally and longitudinally disposed guide slot 12, the bridge piece being of insulated material and the slot being arranged to permit the passage therethrough of the post 8 so as to guide the movable contact in the reciprocation of the core 5. Secured upon each head 10 are contact strips, the strip 13 being arranged above the head 10 of the solenoid 3, while the strip 14 is arranged above the head 10 of the solenoid 4. The contact strips are of identical structure comprising a metallic body secured at one end to the head by a binding screw or the like and overlying and resting upon the bridge piece 11, the relatively inner end of each contact piece being formed with a longitudinally extending recess or channel 15 registering with the groove 12 when the contact strip is in applied position. The upper surface of the strip co-extensive in length with that of the channel 15 is inclined or reduced in thickness from the rear or outer end of the slot to the forward end of the strip, so that at the latter end the upper surface of the strip is practically coincident with the upper surface of the bridge piece 11. The opposing edges of the button 9 are slightly rounded, as at 16, to insure the riding of the button upon the upper surface of the coöperative strip in the movement of the core, it being understood that the button is so disposed upon the post that in the full movement of the core in one direction or the other said buttons will ride upon and make wedging contact with the upper surface of the wedging strip, insuring an effective connection between the button and strip. The bridge point or the mechanical connections whereby the point is actually thrown are not material to the present invention and are not illustrated, it being understood that such means may be any one of several effective types which are designed to be reversely operated by the delivery of an electrical current along one path or another.

With particular reference to Fig. 1, wherein is shown the various circuits of the present invention, it will be noted that on the main track immediately preceding the switch section is arranged a trolley pan including a contact section 17 on one side of the main trolley wire 18 and a shorter contact section 19 on the opposing side of the trolley wire, guide sections 20 and 21 being arranged in both directions beyond and in alinement with the shorter contact section 19. On the siding beyond the switch points is arranged a second trolley pan corresponding to the first mentioned trolley pan, that is including a main contact section 22 on one side of the siding trolley wire 23 and a shorter contact section 24 on the opposite side, the guide sections 26 and 27 coöperating with the shorter contact section 24 as in the previously described trolley pan. It is to be understood that throughout the length of each trolley pan the trolley wire is offset from its normal plane, that is disposed beyond the trolley pans, and, therefore, beyond being engaged by the trolley wire, as 28, during this travel lengthwise the respective pans. The electrical connections between the various parts of the structure are as follows: In advance of the main trolley pan a main service conductor 29 is connected to the main trolley wire 18 at one end and at the opposite end to a connector 30 between the solenoids 3 and 4 and connecting the latter in series. The service conductor to the solenoid 3 includes a wire or other connector 31 leading from the main trolley pan section 17, the service conductor 32 for the opposing solenoid 4 leading from the main contact section 22 of the side trolley pan. The solenoids are thus in series with the respective contact sections 17 and 22 of the main and side trolley pans, while the trolley wire connects the solenoids in parallel forming with either of the solenoid connectors a circuit through either solenoid independent of the other as will presently appear. The contact sections 19 and 24 of the main and siding trolley pans are connected by service connectors 33—34 to each other and to a choke coil 35 which in turn is in circuit through a connector 36 with the sliding contact including the button 9. The respective contact strips 13 and 14 are in electrical connection through conductors 37—38 with the switch throwing mechanism, which mechanism, as previously mentioned, is designed to be reversely affected by a current through said conductors, that is energization through conductor 37 will move the point in one direction while energization from the conductor 38 will move the point in the opposite direction.

With the parts constructed and arranged as described, the operation is as follows:— Assuming that the car is intended to travel along the main track without entering the siding, the motorman throws the controller to "off" position so as to prevent current of sufficient strength to pass through the solenoid for drawing the core thereof to the left for establishing a path for current through the switch-throwing mechanism. When the trolley 28 passes into engagement with the section 19, current will flow from the trolley wire through the conductor 29, conductor 30, solenoid 3, conductor 31, section 17, trolley 28, section 19, conductor 33, choke coil 35, conductors 36 and 38. This current, however, is not of sufficient strength to energize the solenoid 3, and hence the car will continue along the main line without entering the siding. If, however, it is intended to direct the car into the siding, the motorman will throw the controller to "on" position so that current of full strength will pass through the solenoid 3 when the trolley 28 reaches the section 19 of the trolley pan. Current now flows from the trolley wire 18, through the conductors 29 and 30, solenoid 3, conductor 31, section 17 of the trolley pan, trolley 28, and propelling motors of the car. The plunger of the solenoid is now drawn to the left so as to cause the conductor 36 to be connected with the conductor 37 and current is now diverted from the trolley 28 through the section 19, conductor 33, choke coil 35, and conductors 36 and 37. The switch points are now thrown so that the car will pass into the siding. As soon as the trolley 28 reaches the section 24 of the trolley pan for the siding, current will first pass from the trolley wire 18 to and through the conductor 29, conductor 30, solenoid 4, conductor 32, section 22, trolley 28, and propelling motors of the car. This current is of sufficient strength to energize the solenoid 4 so as to move the plunger to the right and connect the conductor 36 with the wire 37. The current is now diverted from the trolley through the section 24, conductor 34, choke coil 35, conductors 36 and 38, and consequently the switch-throwing mechanism will be energized so as to return the switch points to normal position so that the succeeding car can pass along the main line, if desired. In case a second car should follow immediately after the preceding one and before the latter had a chance to pass through the switch, it would be impossible for the succeeding car to operate the switch points and derail the forward car. Should the succeeding car advance to a point where its trolley 28 is in contact with the section 19, a circuit would be established in which the solenoid 3 would be included and the mere energization of the latter would have no effect on the circuit of the switch-throwing mechanism other than to maintain the switch points in the position into which they have been thrown by the preceding car before it entered the siding. The car can thus pass into the siding without the succeeding car interfering in any manner with the position of the switch points, and the motorman of the second car will have to slow down the motors until sufficient time has elapsed to permit the trolley of the first car to reach the section 24 of the trolley pan, because the first car must restore the switch to such a position that the second car can travel on the main line. When the trolley of the first car reaches the section 24 of the pan, the solenoid 4 will be energized as hereinbefore explained, to connect the switch-throwing mechanism in circuit to restore the switch points to normal position. It will thus be seen that the first car governs the mechanism of the switch and the second or succeeding car has no effect whatever on the latter, and before the second car can proceed along the main line, it must allow the first car to cause the re-setting of the switch.

Having thus described the invention what is claimed as new, is:—

1. An electrically operated switch mechanism including a movable switch point, independent conductors for controlling the direction of movement of said point, a contact arranged to engage either conductor, a circuit open at one point to energize the contact, a second circuit open at a remote point to energize the contact, a controlling circuit open at one point to move the contact in one direction, a second controlling circuit open at a relatively remote point for operating the contact in the opposite direction, and means for simultaneously closing the first controlling circuit and energizing the contact to operate the switch point in one direction, said means serving to subsequently close the second controlling circuit and energize the contact, whereby in the first operation the switch point is moved in one direction and in the second operation the switch point is moved in the opposite direction.

2. An electrically controlled switch operating mechanism including a switch point, a conductor adapted upon energization to operate the point in one direction, a second conductor adapted upon energization to operate the switch point in the opposite direction, a service main, a contact point coöperating with either of said conductors, means for operating the contact point in either direction, a series of circuits including the service main, the contact operating means and the contact, said series circuit being normally open and adapted to be closed by the travel of a car over a prescribed limit, and a second series circuit arranged relatively remote from the first series circuit and including the contact operating means and the contact, said second series circuit being normally open and adapted to be closed by the travel of a car in a prescribed path.

3. An electrically controlled switch operating mechanism including a switch point, a conductor adapted upon energization to operate the point in one direction, a second conductor adapted upon energization to operate the switch point in the opposite direction, a service main, a contact point coöperating with either of said conductors, means for operating the contact point in either direction, a series of circuits including the service main, the contact operating means and the contact, said series circuit being normally open and adapted to be closed by the travel of a car over a prescribed limit, and a second series circuit arranged relatively remote from the first series circuit and including the contact operating means and the contact, said second series circuit being normally open and adapted to be closed by the travel of a car in a prescribed path, said respective series circuits operating the contact point in reverse directions.

4. The combination with a main track, a siding and a switch point controlling the travel of a car along the main track or into the siding, of independent conductors adapted upon respective energization to oppositely move the switch point, of a trolley pan arranged on the main track in advance of the switch point, a second trolley pan arranged on the siding beyond the switch point, each of said trolley pans including spaced contact sections, opposing solenoids, a unitary core reversely affected by the solenoids, a contact carried by the core to coöperate with either of the conductors, a resistance in circuit with the contact, a service main, a conductor leading from one contact section of each trolley pan to the respective solenoids in opposition, a conductor leading from the service main to both solenoids in parallel, a conductor leading from one of the opposing contact sections of one pan to the similar contact section of the other, and a connection between said conductor and the resistance in the contact circuit.

In testimony whereof I affix my signature in presence of two witnesses.

BERNARD SCHLATER.

Witnesses:
JNO. F. ADOLFF,
ANTON A. LUEKE.

Copies of this patent may be obtained for five cents each, by addressing the "Commissioner of Patents, Washington, D. C."